S. SELDEN & M. GRISWOLD, Jr.
Stove-Pipe Damper.
No. 226,680. Patented April 20, 1880.
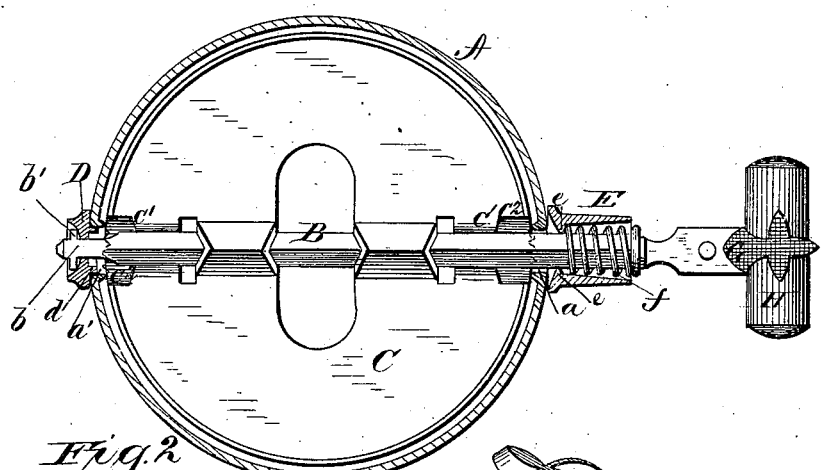
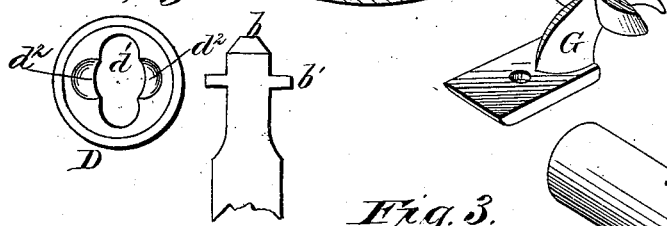
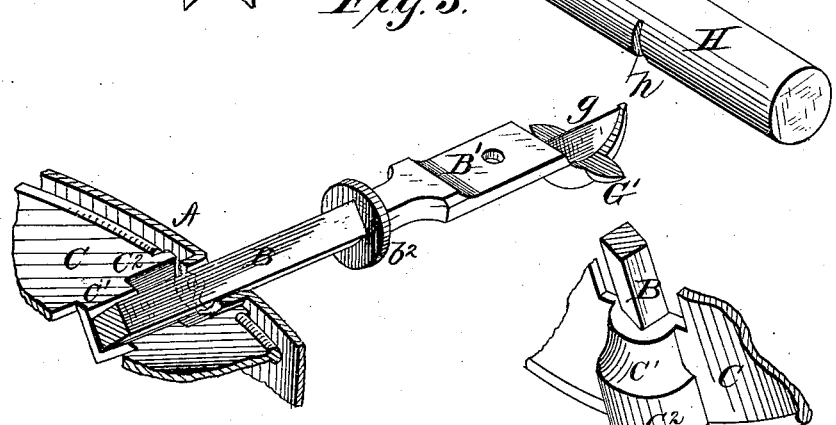
WITNESSES
INVENTORS
Samuel Selden,
Matthew Griswold, Jr.
by A. M. Smith ATTORNEY

UNITED STATES PATENT OFFICE.

SAMUEL SELDEN AND MATTHEW GRISWOLD, JR., OF ERIE, PENNSYLVANIA.

STOVE-PIPE DAMPER.

SPECIFICATION forming part of Letters Patent No. 226,680, dated April 20, 1880.

Application filed November 18, 1879.

*To all whom it may concern:*

Be it known that we, SAMUEL SELDEN and MATTHEW GRISWOLD, Jr., of the city and county of Erie, State of Pennsylvania, have invented certain new and useful Improvements in Stove-Pipe Dampers, of which the following is a full, clear, and exact description, reference being had to the accompanying drawings, making part of this specification, in which—

Figure 1 is a side elevation of the improved damper, partly in section, to show the arrangement of the parts. Fig. 2 represents a face view of the friction-ring at the outer end of the spindle and a side view of the end of the spindle to which said ring is applied; and Fig. 3 is a perspective view of the parts forming the handle of the damper, and portions of the pipe and damper broken away.

Similar letters of reference denote corresponding parts wherever used.

The invention relates to the means for holding the damper at any desired adjustment, for insuring its free and unobstructed rotation when it is desired to adjust, and to the construction of the handle for operating it; and it consists, first, in the combination, with the spindle to which the socketed damper is attached, and which is provided with a friction ring or sleeve and spring at its handle end similar to that described in our patent of March 13, 1877, No. 188,418, of a second socketed ring or sleeve at the opposite end of the spindle, and secured to and turning therewith, the action of the spring serving to grasp the pipe snugly between the two rings or sleeves and to hold the damper at any desired adjustment by frictional contact of the rings upon the outer surface only of the pipe, as hereinafter explained.

It further consists in making the end sockets or half-sleeves of the damper in hood form, and of greater diameter than the perforations in the pipe for the spindle, so that their contact with the pipe shall be outside of the ragged edge of the perforations, and thereby prevent the latter from interfering with the free rotation of the damper in adjusting it; and it further consists in a novel manner of uniting the wooden handle to the spindle by making the handle end of said spindle in two parts, each having a half-ring formed upon it, and one provided with a rib entering a transverse groove in the handle for preventing end displacement of said handle when clamped by the divided ring, as hereinafter explained.

In the accompanying drawings, A represents a section of pipe; B, the damper-spindle, passing through perforations $a$ $a'$ in the pipe, and C the socketed damper plate or disk secured thereon. The spindle is made square or polygonal in form, except at its outer end, as shown, and the sockets in the damper for its reception are made in the usual corresponding form, except that those marked $c'$, at the outer edges, are expanded at their outer ends, $c^2$, and given a semi-cylindrical or hood form, and are of greater diameter than the perforations in the pipe for the reception of the spindle.

By this construction, if the edge of the damper comes in contact with the perforated sides of the pipe the contact will be outside of and around the ragged edges of the perforations, and consequently the latter will not interfere with the smooth and easy rotation of the damper in adjusting it as desired.

The outer end, $b$, of the spindle, passing through the pipe, is reduced in size and rounded, except near its extreme end, where two spurs or projecting pins, $b'$, are left or formed upon it on opposite sides, as shown in Figs. 1 and 2, which enter sockets in a ring or button, D. This ring or button is provided on its inner face with a short sleeve, $d$, surrounding the end of the spindle and entering the perforation $a'$ in the pipe therefor, the inner face of the button overlapping the edges of said perforation and resting upon the pipe, as shown in Fig. 1. The perforation through the sleeve and ring or button is elongated, as represented at $d'$, Fig. 2, to permit the passage of the spurs or pins $b'$, and at right angles to this slot are formed sockets $d^2$, which receive and retain the pins $b'$ when turned into proper position.

The spindle is provided near its handle with a collar, $b^2$, and between this and the pipe A is a sleeve, E, the perforation through which is reduced to near about the diameter of the spindle at its inner end, and thence outward is enlarged, forming a shoulder at $e$, against which a spring, $f$, arranged within the sleeve and around the spindle, rests at one end, the other end resting against the collar $b^2$. The spindle, with the spring and sleeve placed upon it, as shown, is passed through the perforations $a$, through the sockets in the damper, then through perforations $a'$, compressing the spring $f$ when the ring or sleeve D is placed upon it, and turned to bring the pins $b'$ into the sockets $d^2$, thereby securing it to and causing it to turn with the spindle. By this arrangement the spring is made to draw the sleeves D and E into frictional contact with the outer face of the pipe upon its opposite sides, and thus to hold the damper firmly at any angle of adjustment at which it may be set. The shank end of the spindle outside of the collar $b^2$ is flattened or expanded in width, and at its end has an extension in the form, or thereabout, of a half-ring, G, made by preference to taper outward from the shank, as shown, and provided on its inner concave face with a longitudinal rib, $g$, as shown.

G' is a second half-ring, of form similar to G, but without the rib on its inner face. The part G' is attached to a base-plate which fits in a suitable socket at B' in the shank end of the spindle, and when secured thereto by a screw or rivet forms a part of the shank.

H is a handle made of wood, cylindrical in form, and provided on one side, midway of its length, with a transverse slit or kerf, $h$, which forms a socket, into which the rib $g$ enters, serving to prevent end movement of the handle H when clamped between the jaws or half-rings G G', and the latter are riveted or otherwise fastened together, as explained. By this arrangement a secure fastening for the wooden handle is obtained, and one also that facilitates the removal of the handle when required.

Having now described our invention, we claim—

1. The damper-spindle provided with the retaining pin or spurs $b'$, in combination with the slotted or socketed sleeve or ring at its outer end, substantially as described.

2. The combination, with the damper-spindle, of the frictional sleeves D and E and spring $f$, constructed, arranged, and operating substantially as described.

3. The socketed disk or damper-plate provided with the semi-cylindrical hoods $c^2$ at the ends of the side sockets, substantially as and for the purpose described.

4. The damper-spindle having the divided shank provided with the half-ring clamps and the retaining-rib, in combination with the grooved wooden handle H, applied and operating substantially as described.

SAML. SELDEN.
MATTHEW GRISWOLD, JR.

Witnesses:
SAMUEL S. SPENCER,
M. C. BURGESS.